(12) United States Patent
Zhang et al.

(10) Patent No.: US 7,583,815 B2
(45) Date of Patent: Sep. 1, 2009

(54) WIDE-AREA SITE-BASED VIDEO SURVEILLANCE SYSTEM

(75) Inventors: Zhong Zhang, Herndon, VA (US); Li Yu, Herndon, VA (US); Haiying Liu, Chantilly, VA (US); Paul C. Brewer, Arlington, VA (US); Andrew J. Chosak, Arlington, VA (US); Himaanshu Gupta, Herndon, VA (US); Niels Haering, Reston, VA (US); Omar Javed, Herndon, VA (US); Alan J. Lipton, Herndon, VA (US); Zeeshan Rasheed, Reston, VA (US); Pèter L. Venetianer, McLean, VA (US); Weihong Yin, Herndon, VA (US); Liangyin Yu, Herndon, VA (US)

(73) Assignee: ObjectVideo Inc., Reston, VA (US)

( * ) Notice: Subject to any disclaimer, the term of this patent is extended or adjusted under 35 U.S.C. 154(b) by 626 days.

(21) Appl. No.: 11/098,579

(22) Filed: Apr. 5, 2005

(65) Prior Publication Data

US 2006/0222209 A1    Oct. 5, 2006

(51) Int. Cl.
*G06K 9/00* (2006.01)
*H04N 5/225* (2006.01)

(52) U.S. Cl. .................................. 382/103; 348/169
(58) Field of Classification Search .................. None
See application file for complete search history.

(56) References Cited

U.S. PATENT DOCUMENTS 6,359,647 B1 *  3/2002  Sengupta et al. ............ 348/154
6,628,835 B1     9/2003  Brill et al.
6,970,183 B1    11/2005  Monroe
7,006,950 B1 *   2/2006  Greiffenhagen et al. ........ 703/2

(Continued)

OTHER PUBLICATIONS

R. Y. Tsai, "A Versatile Camera Calibration Technique for High-Accuracy 3D Machine Vision Metrology Using Off-The-Shelf TV Cameras and Lenses," IEEE Journal of Robotics and Automation, 3(4), pp. 323-344, Aug. 1987.

(Continued)

*Primary Examiner*—Matthew C Bella
*Assistant Examiner*—Yuzhen Ge
(74) *Attorney, Agent, or Firm*—Venable LLP; Michael A. Sartori; Yao Wang

(57) ABSTRACT

A computer-readable medium contains software that, when read by a computer, causes the computer to perform a method for wide-area site-based surveillance. The method includes receiving surveillance data, including view targets, from a plurality of sensors at a site; synchronizing the surveillance data to a single time source; maintaining a site model of the site, wherein the site model comprises a site map, a human size map, and a sensor network model; analyzing the synchronized data using the site model to determine if the view targets represent a same physical object in the site; creating a map target corresponding to a physical object in the site, wherein the map target includes at least one view target; receiving a user-defined global event of interest, wherein the user-defined global event of interest is based on the site map and based on a set of rules; detecting the user-defined global event of interest in real time based on a behavior of the map target; and responding to the detected event of interest according to a user-defined response to the user-defined global event of interest.

21 Claims, 18 Drawing Sheets

U.S. PATENT DOCUMENTS

| | | |
|---|---|---|
| 2002/0071033 A1* | 6/2002 | Gutta et al. ............... 348/143 |
| 2003/0023595 A1* | 1/2003 | Carlbom et al. ............... 707/7 |
| 2003/0085992 A1* | 5/2003 | Arpa et al. ............... 348/47 |
| 2004/0008253 A1* | 1/2004 | Monroe ............... 348/143 |
| 2004/0017930 A1 | 1/2004 | Kim et al. |
| 2004/0066970 A1 | 4/2004 | Matsugu |
| 2004/0075738 A1* | 4/2004 | Burke et al. ............... 348/143 |
| 2004/0155960 A1* | 8/2004 | Wren et al. ............... 348/150 |
| 2005/0024206 A1* | 2/2005 | Samarasekera et al. ..... 340/541 |
| 2005/0036036 A1* | 2/2005 | Stevenson et al. ...... 348/211.99 |
| 2005/0073585 A1* | 4/2005 | Ettinger et al. ............... 348/155 |
| 2005/0265582 A1* | 12/2005 | Buehler et al. ............... 382/103 |

OTHER PUBLICATIONS

P.F. Sturm and S.J. Maybank, "On Plane-Based Camera Calibration: A General Algorithm, Singularities, Applications," Proc. Computer Vision and Pattern Recognition, vol. 1, pp. 432-437, 1999.

Z. Zhang, "Flexible Camera Calibration by Viewing a Plane From Unknown Orientations," Proc. $7^{th}$ International Conference on Computer Vision, vol. 1, pp. 666-673, 1999.

Kumar, et al., Aerial Video Surveillance and Exploitation, Proceedings of the IEEE, vol. 89, Oct. 2001, pp. 1518-1539.

* cited by examiner

Fig. 10 human model and human size statistic table
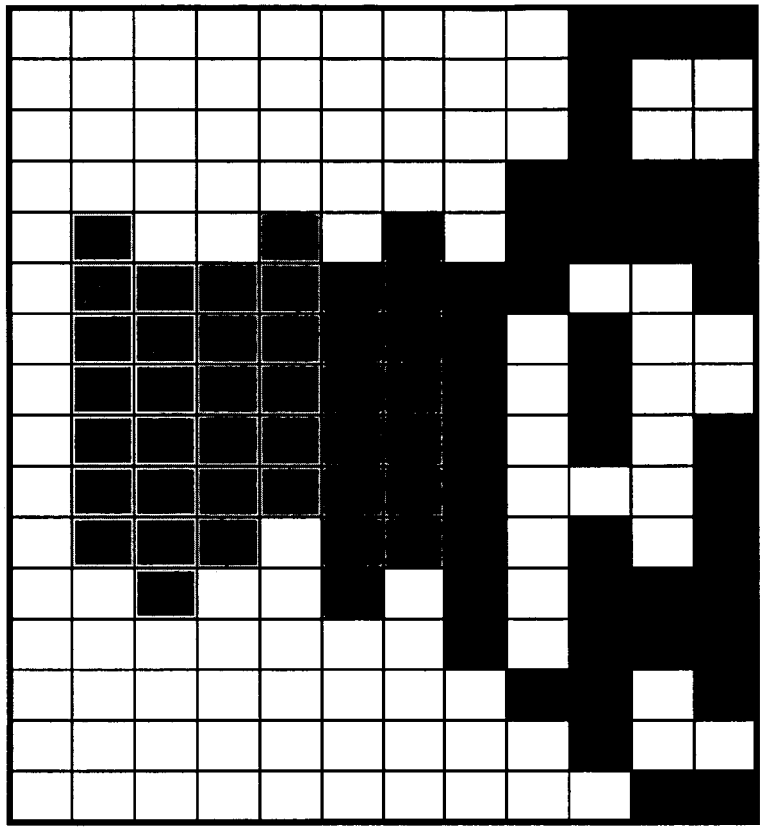
(b) Human size statistic table
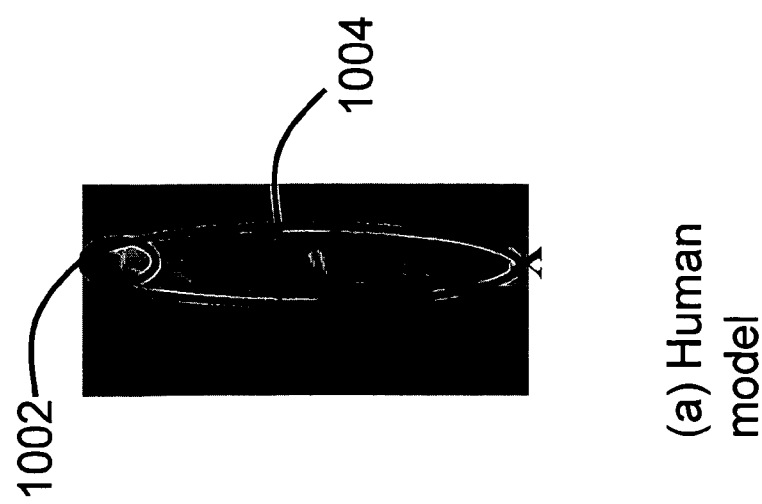
(a) Human model

US 7,583,815 B2

WIDE-AREA SITE-BASED VIDEO SURVEILLANCE SYSTEM

BACKGROUND OF THE INVENTION

1. Field of the Invention

This invention relates to surveillance systems. Specifically, the invention relates to a video-based surveillance system that monitors a wide range of area by fusing the data from multiple surveillance cameras.

2. Related Art

Some state of art intelligent video surveillance (IVS) system can perform content analysis on the image view of each camera. Based on user defined rules or policies, IVS systems can automatically detect potential threats by detecting, tracking and analyzing the targets in the scene. While this type of system has been proven to be very effective and helpful for video surveillance applications, its capability may be constrained by the fact that an isolated single camera can only monitor a limited area. Further, conventional systems usually do not remember past targets, especially when the past targets appeared to act normally, thus a conventional system cannot detect the threats which can only be inferred by repeatable actions.

Now, security needs demand much more capabilities from IVS. For example, a nuclear power plant may have more than ten intelligent surveillance cameras monitoring the surroundings of one of its critical facilities. It may be desirable to receive an alert when there may be some target (e.g., a human or vehicle) loitering around the site for more than fifteen minutes, or when the same target approaches the site more than three times in a day. The conventional individual camera system would fail to detect the threats because a target of interest may loiter at the site for more than an hour, but not stay in any single camera view for more than two minutes, or the same suspect target might approach the site five times in a day but from different directions.

What may be needed then may be an improved IVS system that overcomes shortcomings of conventional solutions.

SUMMARY OF THE INVENTION

The invention includes a method, a system, an apparatus, and an article of manufacture for wide-area site-based video surveillance.

An embodiment of the invention may be a computer-readable medium contains software that, when read by a computer, causes the computer to perform a method for wide-area site-based surveillance. The method includes receiving surveillance data, including view targets, from a plurality of sensors at a site; synchronizing the surveillance data to a single time source; maintaining a site model of the site, wherein the site model comprises a site map, a human size map, and a sensor network model; analyzing the synchronized data using the site model to determine if the view targets represent a same physical object in the site. The method further includes creating a map target corresponding to a physical object in the site, wherein the map target includes at least one view target; receiving a user-defined global event of interest, wherein the user-defined global event of interest is based on the site map and based on a set of rules; detecting the user-defined global event of interest in real time based on a behavior of the map target; and responding to the detected event of interest according to a user-defined response to the user-defined global event of interest.

In another embodiment, the invention may be a computer-readable medium containing software that, when read by a computer, causes the computer to perform a method for wide-area site-based surveillance, the software comprising: a data receiver module, adapted to receive and synchronize surveillance data, including view targets, from a plurality of sensors at a site; and a data fusion engine, adapted to receive the synchronized data, wherein the data fusion engine comprises: a site model manager, adapted to maintain a site model, wherein the site model comprises a site map, a human size map, and a sensor network model; a target fusion engine, adapted to analyze the synchronized data using the site model to determine if the view targets represent a same physical object in the site, and create a map target corresponding to a physical object in the site, wherein the map target comprises at least one view target; and an event detect and response engine, adapted to detect an event of interest based on a behavior of the map target.

A system for the invention includes a computer system including a computer-readable medium having software to operate a computer in accordance with the invention.

An apparatus for the invention includes a computer including a computer-readable medium having software to operate the computer in accordance with the invention.

An article of manufacture for the invention includes a computer-readable medium having software to operate a computer in accordance with the invention.

Exemplary features and advantages of the invention, as well as the structure and operation of various embodiments of the invention, may be described in detail below with reference to the accompanying drawings.

BRIEF DESCRIPTION OF THE DRAWINGS

The foregoing and other features and advantages of the invention will be apparent from the following, more particular description of exemplary embodiments of the invention, as illustrated in the accompanying drawings wherein like reference numbers generally indicate identical, functionally similar, and/or structurally similar elements. The left most digits in the corresponding reference number indicate the drawing in which an element first appears.

FIG. 10 illustrates the human model and the human size statistic table;

DEFINITIONS

Figure 1:
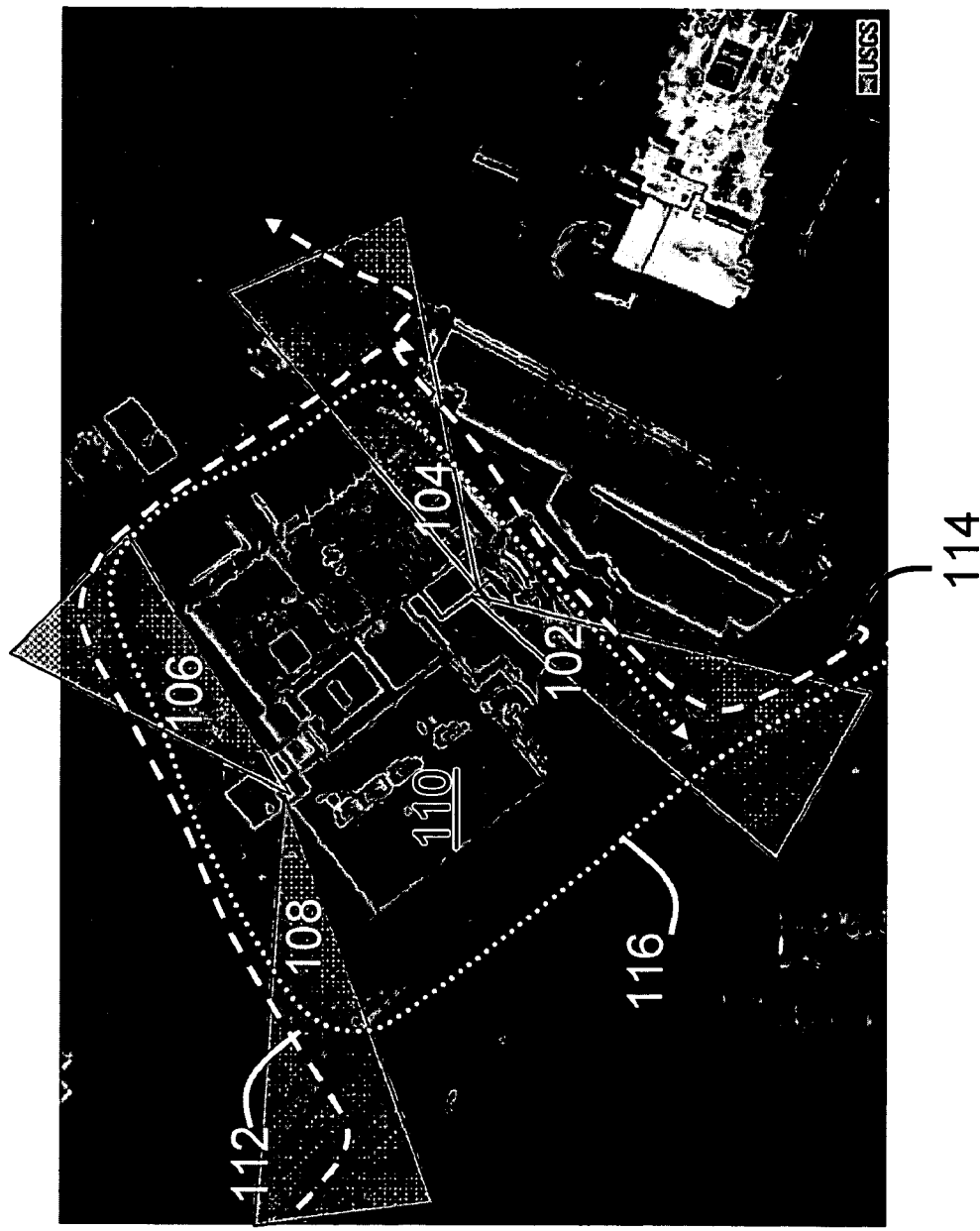
FIG. 1 depicts a typical application scenario of the invention.

The following definitions may be applicable throughout this disclosure, including in the above.

A "video" may refer to motion pictures represented in analog and/or digital form. Examples of video may include: television, movies, image sequences from a video camera or other observer, and computer-generated image sequences.

A "frame" may refer to a particular image or other discrete unit within a video.

An "object" may refer to an item of interest in a video. Examples of an object may include: a person, a vehicle, an animal, and a physical subject.

A "target" may refer to a computer model of an object. The target may be derived from the image processing, with a one to one correspondence between targets and objects.

A "view" may refer to what a camera may see for a particular camera viewing position. A camera may have multiple views if its position or viewing angle change.

A "map" or a "site map" may refer to an image or graphical representation of the site of interest. Examples of a map may include: an aerial photograph, a blueprint, a computer graphical drawing, a video frame, or a normal photograph of the site.

A "view target" may refer to a target from each single camera IVS system and the associated site location information, for each camera.

A "map target" may refer to an integrated model of an object on the map. Each map target may at one time correspond to one and only one object in the real world, but may include several view targets.

A "video sensor" may refer to an IVS system which only processes one camera feed. The inputs may be the frame, and outputs may be tracked targets in that particular camera field of view (FOV).

A "fusion sensor" may refer to the present cross-camera site IVS system which may not process raw video frames. The inputs may be view target data from a single IVS system, or may be map target data from other fusion sensors.

A "sensor" may refer to any apparatus for obtaining information about events occurring in a view. Examples include: color and monochrome cameras, video cameras, static cameras, pan-tilt-zoom cameras, omni-cameras, closed-circuit television (CCTV) cameras, charge-coupled device (CCD) sensors, analog and digital cameras, PC cameras, web cameras, tripwire event detectors, loitering event detectors, and infra-red-imaging devices. If not more specifically described, a "camera" refers to any sensing device.

A "computer" refers to any apparatus that is capable of accepting a structured input, processing the structured input according to prescribed rules, and producing results of the processing as output. The computer can include, for example, any apparatus that accepts data, processes the data in accordance with one or more stored software programs, generates results, and typically includes input, output, storage, arithmetic, logic, and control units. Examples of a computer include: a computer; a general purpose computer; a supercomputer; a mainframe; a super mini-computer; a mini-computer; a workstation; a micro-computer; a server; an interactive television; a web appliance; a telecommunications device with internet access; a hybrid combination of a computer and an interactive television; a portable computer; a personal digital assistant (PDA); a portable telephone; and application-specific hardware to emulate a computer and/or software, for example, a programmable gate array (PGA) or a programmed digital signal processor (DSP). A computer can be stationary or portable. A computer can have a single processor or multiple processors, which can operate in parallel and/or not in parallel. A computer also refer to two or more computers connected together via a network for transmitting or receiving information between the computers. An example of such a computer may include a distributed computer system for processing information via computers linked by a network.

A "computer-readable medium" may refer to any storage device used for storing data accessible by a computer. Examples of a computer-readable medium include: a magnetic hard disk; a floppy disk; an optical disk, such as a CD-ROM and a DVD; a magnetic tape; and a memory chip.

"Software" may refer to prescribed rules to operate a computer. Examples of software include: software; code segments; instructions; software programs; computer programs; and programmed logic.

A "computer system" may refer to a system having a computer, where the computer comprises a computer-readable medium embodying software to operate the computer.

A "network" may refer to a number of computers and associated devices that may be connected by communication facilities. A network may involve permanent connections such as cables or temporary connections such as those made through telephone, wireless, or other communication links. Examples of a network include: an internet, such as the Internet; an intranet; a local area network (LAN); a wide area network (WAN); and a combination of networks, such as an internet and an intranet.

DETAILED DESCRIPTION OF EMBODIMENTS OF THE PRESENT INVENTION

An exemplary embodiment of the invention may be discussed in detail below. While specific exemplary embodiments may be discussed, it should be understood that this may be done for illustration purposes only. A person skilled in the relevant art will recognize that other components and configurations can be used without parting from the spirit and scope of the invention.

Embodiments of the present invention may be based on existing single camera IVS systems with increased automatic situation awareness capability under both spatial and temporal domains. The input to the system may be content analysis results from multiple individual cameras, such as tracked humans and vehicles. The output may be tracked targets in the site under monitoring and global events detected by the system. In summary, the task of the system may be to perform data fusion on the information from individual sensors and provide more reliable and powerful surveillance capability.

There may be several major challenges to overcome to achieve data fusion from multiple sensor sources. A first challenge may be to determine how to associate the targets from different cameras. There may be multiple cameras in the site under surveillance, and the cameras may be of different types, e.g., static, PTZ, Omni, etc. The individual cameras or sensors usually may be looking at different areas; and they may or may not have overlapped fields of view. When a physical target may be detected, it may be detected simultaneously by multiple cameras but with different target ids. A target may also be detected by the same or different camera at different times. The inventive system may receive detected targets from different cameras for every sample moment. How to reliably associate the different detected targets that correspond to the same physical target may be difficult. In the present invention, several new techniques and an adaptive mechanism may be developed to solve this problem which supports different levels of availabilities on prior knowledge of the site and cameras. The new technologies may include: map-based static, PTZ and omni camera calibration methods; camera network traffic models; human relative size maps; appearance-based target verification; and target fusion algorithms.

A second challenge may be to determine how to provide prompt and easy understandable global and local situation awareness. In addition to detecting what a single camera IVS cannot detect, the wide-area multi-sensor IVS also may need to integrate the potentially duplicated events produced by different individual IVS sensors so as not to confuse the operators. For this purpose, embodiments of the present invention may include a general site model, together with a site-based event detector.

A third challenge may be to determine how to support a large number of cameras and sensors. Since the data may come from distributed sensors and possibly out of sequential order, the data may need to be synchronized with a minimum amount of latency. Data communication among cameras and a center unit may be viable, but increasing the number of cameras may cause a bandwidth limitation issue. Embodiments of the present invention may include a scalable architecture developed to remove this potential limitation.

FIG. 1 depicts an exemplary application scenario for the present invention. In this example, there may be four surveillance cameras 102, 104, 106, and 108 around a building 110 under protection. A conventional IVS system only monitors the FOV of each individual camera. Embodiments of the present invention may monitor both the spatial and temporal domains. Spatially, the monitoring area from an individual camera FOV may be expanded to the whole site of interest by fusing the information gathered by the multiple cameras in the site. Temporally, each target may be tracked for a much longer period of time, even if the target may be temporarily outside of a FOV. For example, if a target came back to a camera FOV after it left for several minutes, the system may recognize that it was still the same target that appeared a while ago using some new appearance verification technologies of the invention. For example, an object following a path indicated by the dashed lines 112 or 114 may be tracked around the building and determined not to be suspicious, while an object following a path indicated by the dotted line 116 may be tracked and found to be suspicious when it re-enters the FOV of camera 102.

Figure 2:
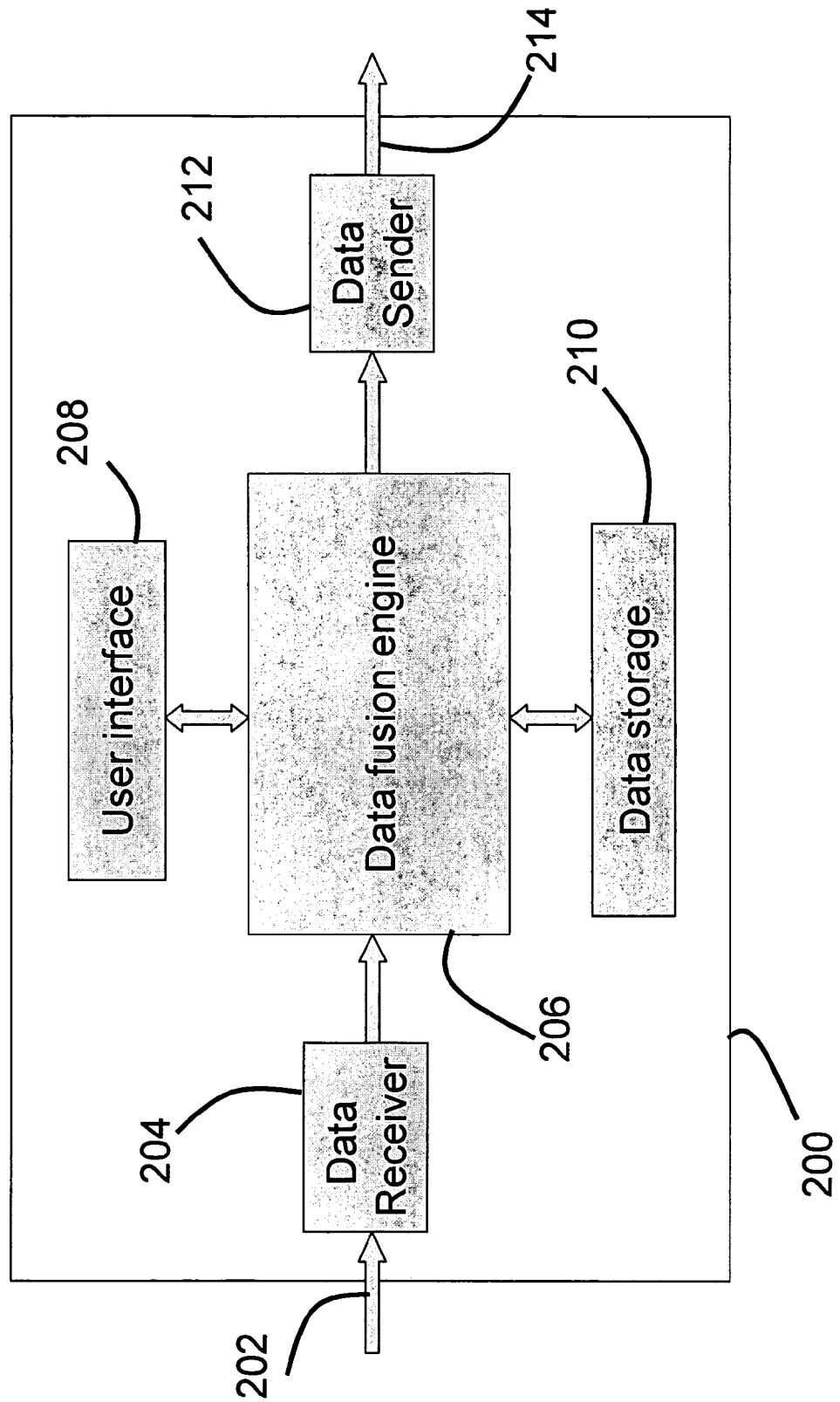
FIG. 2 depicts a conceptual block diagram of the present system.

FIG. 2 depicts a conceptual block diagram of an embodiment of the present cross-camera site IVS system 200, which includes input data 202, a data receiver 204, a data fusion engine 206, a user interface 208, a data storage 210, a data sender 212 and output data 214.

The input data 202 may include the information gathered by lower-level IVS systems, including other cross-camera site IVS systems (e.g., fusion sensors) as well as individual IVS systems (e.g., video cameras). The input data 202 may be targets, video frames, and/or camera coordinates (e.g., pan-tilt-zoom (PTZ) coordinates). In one embodiment, all the sensors may use the same time server, in other words, they may use the same clock. This may be achieved, for example, through network time synchronization. The input data 202 may include a timestamp of the data's own sensor. The data receiver 204 may contain internal buffers for each input sensor. Due to the different process latencies in each input sensor and the different amount of network transmission delays, the data on the same object at a certain time may arrive at different time from different sensors. A major task of the data receiver 204 may be to synchronize the input data 202 and pass them to the data fusion engine 206. The user interface 208 may be used to obtain necessary information about the site and the system from the user, and provide visual assistance to the operator for better situation awareness. The data fusion engine 206 may build and maintain the site model, integrate the corresponding input map and view targets into the map targets in the current site, detect all the events of interest in the site and perform user desired responses to these events. Data storage unit 210 may store and manage all the useful information used or generated by the system. Data sender 212 may be in charge of sending controls to any PTZ cameras in the system and sending map targets to the higher level fusion sensors. The output data 214 may be map targets, current site information and/or other camera commands, e.g., PTZ commands.

Figure 3:
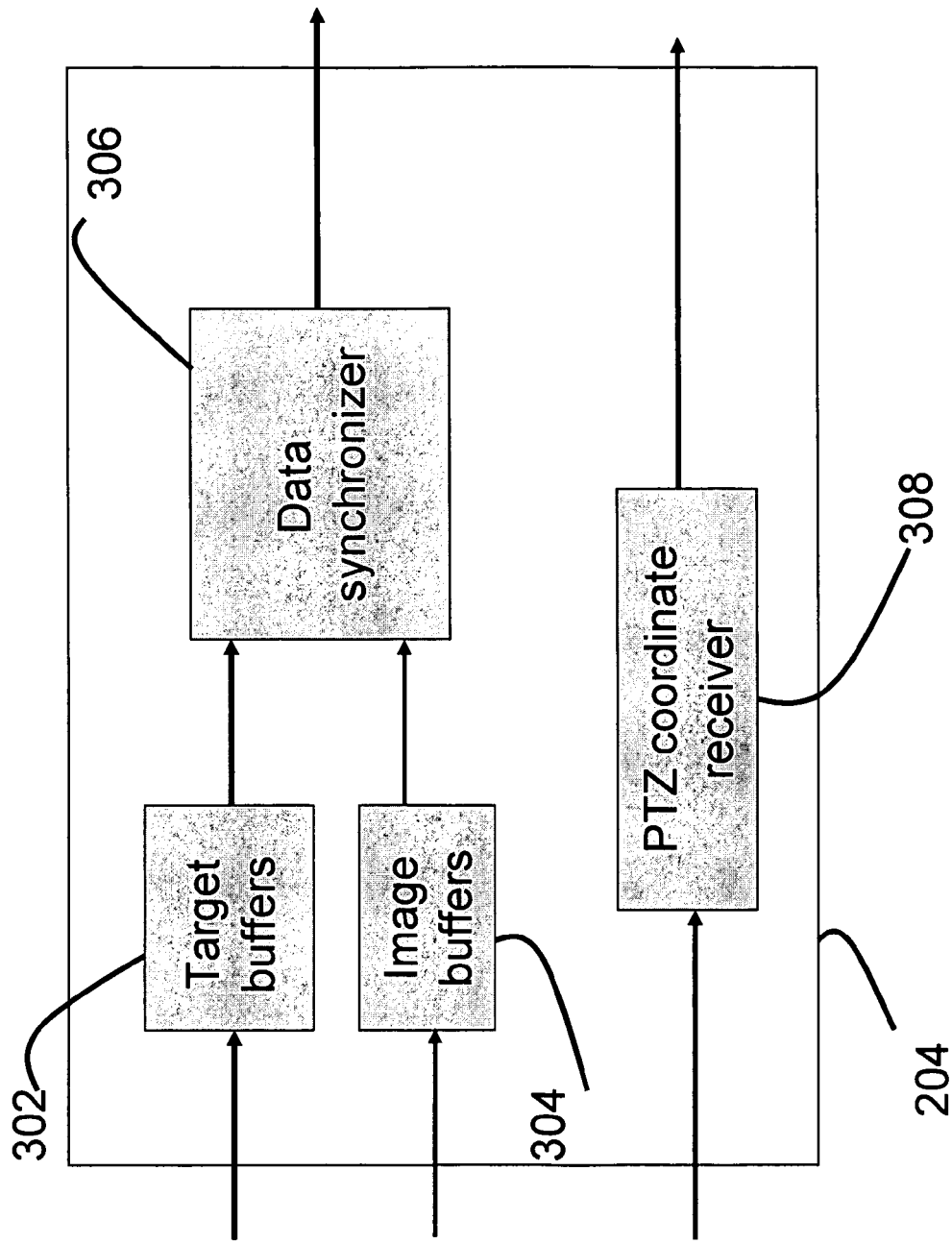
FIG. 3 depicts a block diagram of a data receiver module.

FIG. 3 depicts a conceptual block diagram of the data receiver 204. Module 302 may include a list of target buffers and module 304 may include a list of image buffers. Each input sensor may have its own target buffer and image buffer. These buffers may be time indexed. When each buffer receives new data from the source sensor, the buffer may check the timestamp of that data to compare with the current system time. If the latency may be greater than the system allowed latency, the buffer may discard the data and ask for newer data. Data synchronizer 306 may check the buffers in variable frequency based on the working load of the fusion system and the processing frame rate of the input sensors. The outputs of data synchronizer 306 to the data fusion engine 206 may include target data from different sensors but with a very narrow time window. Module 308 may be dedicated to PTZ camera controls. The pan, tilt and zoom values of a PTZ camera may be required to calibrate the camera on to the site model.

Figure 4:
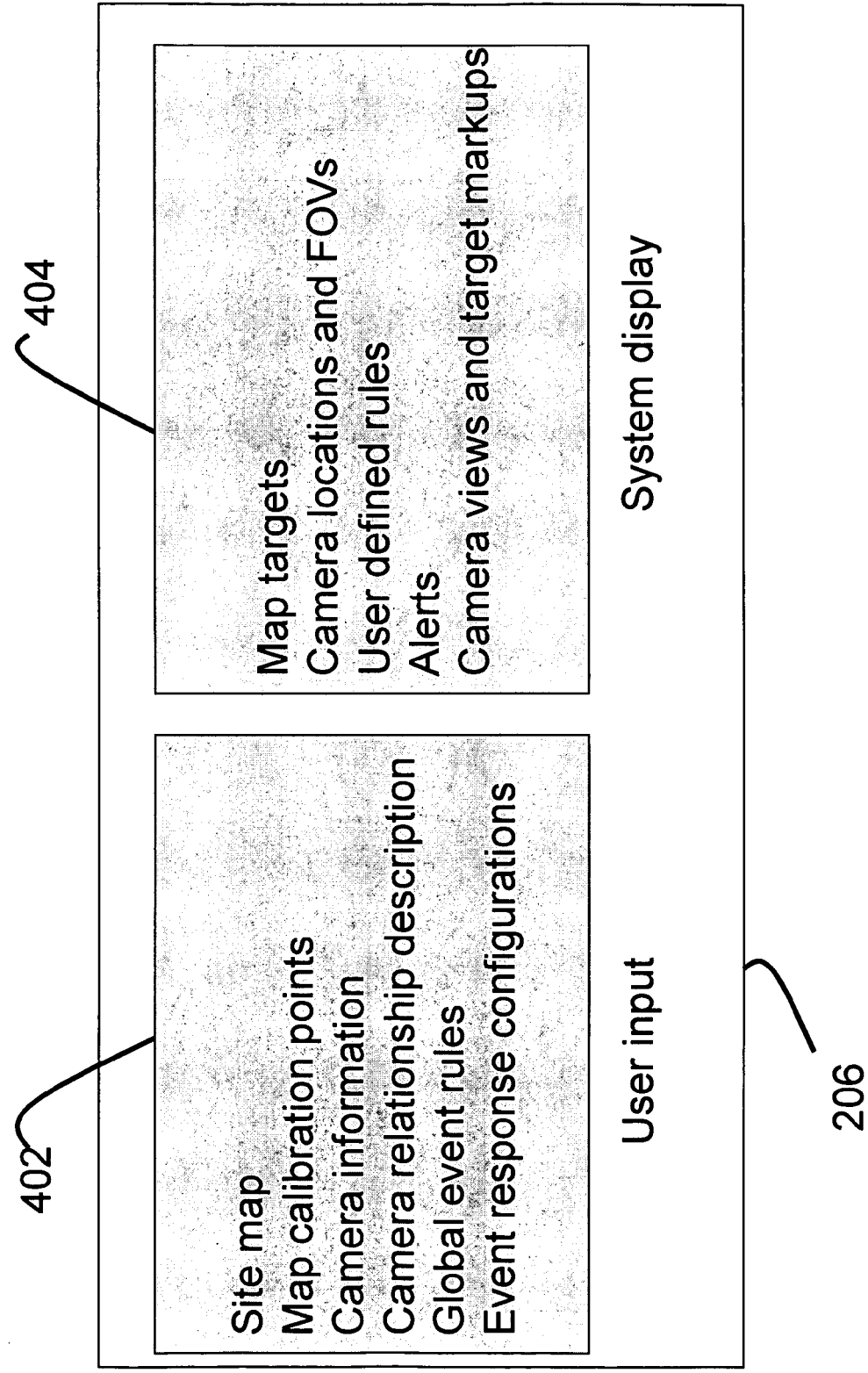
FIG. 4 lists the major graphic user interface (GUI) components.

FIG. 4 lists the major components of the user interface 208. Block 402 may include the data to be obtained from the operator. Block 404 may include the information extracted from the scene, which may be used to provide the operator with better visual perception and situation awareness. The first user-supplied item that the system may require is the site map. Examples of a site map include: a satellite image of the site, a blue print of the site, an aerial photograph of the site, a computer graphical drawing of the site, or even a normal photograph of the site. The purpose of the site map may be to assist the user to set up the global view of the site under surveillance.

The map calibration points may be a list of pairs of map points and image points. The map calibration points may be optional input, and may be needed only when both the map and enough control points on the map are available. Here, the control point may refer to a point on that map having an easily-identified corresponding point in the video frame.

Camera information may refer to the specific properties of each camera, such as camera type, map location, lens specifications, etc.

Camera relationship description may be needed when both the site map and the camera information are lacking. The relationship description provides the normal entry/exit regions in each camera view and each potential path of a target moving from one camera view to another camera view.

Besides the above system information, the user may specify global event rules (e.g., what event may be of interest), and event response configurations (e.g., how the system should respond to these events). Embodiments of the present invention may provide a wide range of visual information in addition to the source videos. The system may, for example, mark up the targets in both the source video frame and the site map in real-time; display the camera locations on the map and their fixed (for static camera) or moving (PTZ camera) field of views; and display an alert once the event is triggered.

Figure 5:
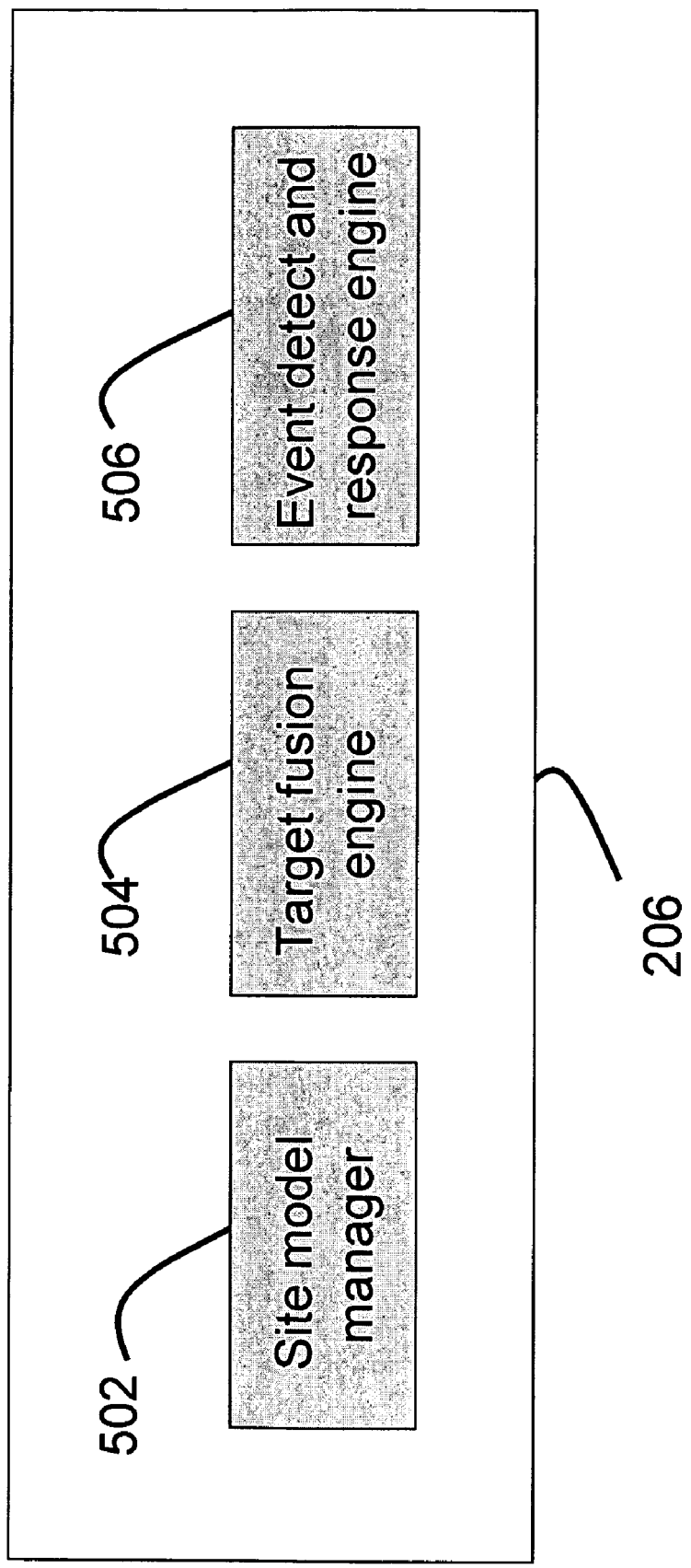
FIG. 5 depicts the main components of the data fusion engine.

FIG. 5 depicts the main components of the data fusion engine 206. The site model manager 502 may be in charge of building and maintaining the site model, which may include the camera to site calibration information and the site traffic information. The target fusion engine 504 may be used to combine all the corresponding view targets from the same or different video sensors into a map target which corresponds to each individual object in the site. Event detection and response engine 506 may be used to detect any event of interest and handle detected event of interest according to the user pre-set configurations.

Figure 6:
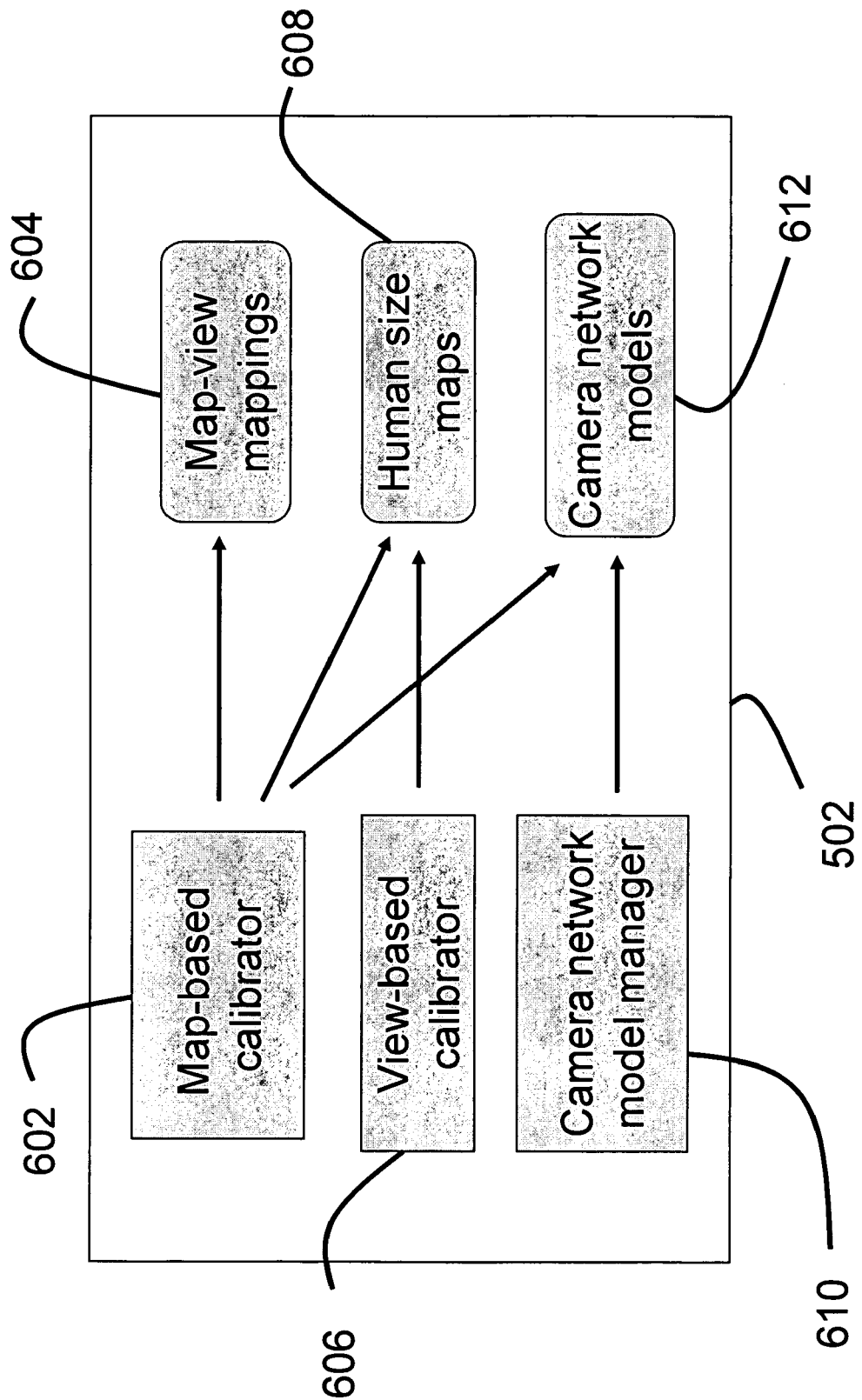
FIG. 6 depicts a conceptual block diagram of the site model manager.

FIG. 6 depicts a conceptual block diagram of the site model manager 502. Map-view mappings 604 may store the camera to site map calibration information and provide the corresponding map location for each video frame pixel and the corresponding image location for each map point. This mapping relationship may be created by the map-based calibrator 602, which may support at least three types of cameras: normal static camera, PTZ camera, and omni-camera. In the wide-area IVS systems, physical location, size and velocity in the site for each target in the video frame may be needed. Knowing both the intrinsic and extrinsic camera parameters, referred as camera calibration, may be very useful for this purpose.

Traditional camera calibration may be performed by viewing a three-dimensional (3D) reference object with a known Euclidean structure. An example of this approach is described, for example, in R. Y. Tsai. "A Versatile Camera Calibration Technique for High-Accuracy 3D Machine Vision Metrology Using Off-the-Shelf TV Cameras and Lenses," IEEE Journal of Robotics and Automation, 3(4): 323-344, August 1987, which may be herein incorporated by reference. This type of technique may yield the best results if the 3D geometry of the reference object is known with high accuracy. In addition, this type of technique may be directly applicable to multi-camera systems by simply repeating the calibration process independently for each camera. However, setting up the 3D reference object with great accuracy may be an elaborate task that requires special equipment and becomes more difficult as the dimensions of the view volume increase.

To reduce such difficulties, a simple and practical camera calibration technique using a model plane with a known 2D reference pattern was proposed by P. F. Sturm and S. J. Maybank, "On Plane-Based Camera Calibration: A General Algorithm, Singularities, Applications,", Proc. Computer Vision and Pattern Recognition, volume 1, pages 432-437, 1999, and Z. Zhang, "Flexible Camera Calibration by Viewing a Plane from Unknown Orientations," Proc. 7th International Conference on Computer Vision, volume 1, pages 666-673, 1999, independently, both of which may be incorporated herein by reference. In this technique, the user may freely place the model plane or the camera at two or more locations and captures images of the reference points. Camera parameters may be recovered from homographs between the model plane and the image plane computed from correspondences between the reference points and their projections. A homograph may be a matrix associating two 3D planes in a space. Although this algorithm may be simpler and may yield good results when calibrating a camera, it may be mainly used for indoor and/or close range applications, where the pattern object captured by the camera may be big enough that the features of the pattern may be easily and accurately detected and measured. Many of the wide area IVS systems may be outdoor applications. To calibrate the camera using the above 2D model plane, a significant large object may be needed to get the required accuracy. Also, this extra calibration procedure may not be allowed due to physical or cost constraints. These factors may make this model-based calibration impractical for wide range of commercial applications.

Embodiments of the present invention may use new methods to quickly and accurately extract the physical location and size of a target, as well as to guide the PTZ cameras in the site to focus on the targets of interest. Here, the site-model manager may need to provide three types of information: the site map location of each view target; the actual size of the target; and the object traffic model of the site. These types of information may be stored in map-view mappings 604, human size maps 608 and camera network models 612, which may be created and managed by map-based calibrator 602, view-based calibrator 606 and camera network model manager 610, respectively.

Figure 7:
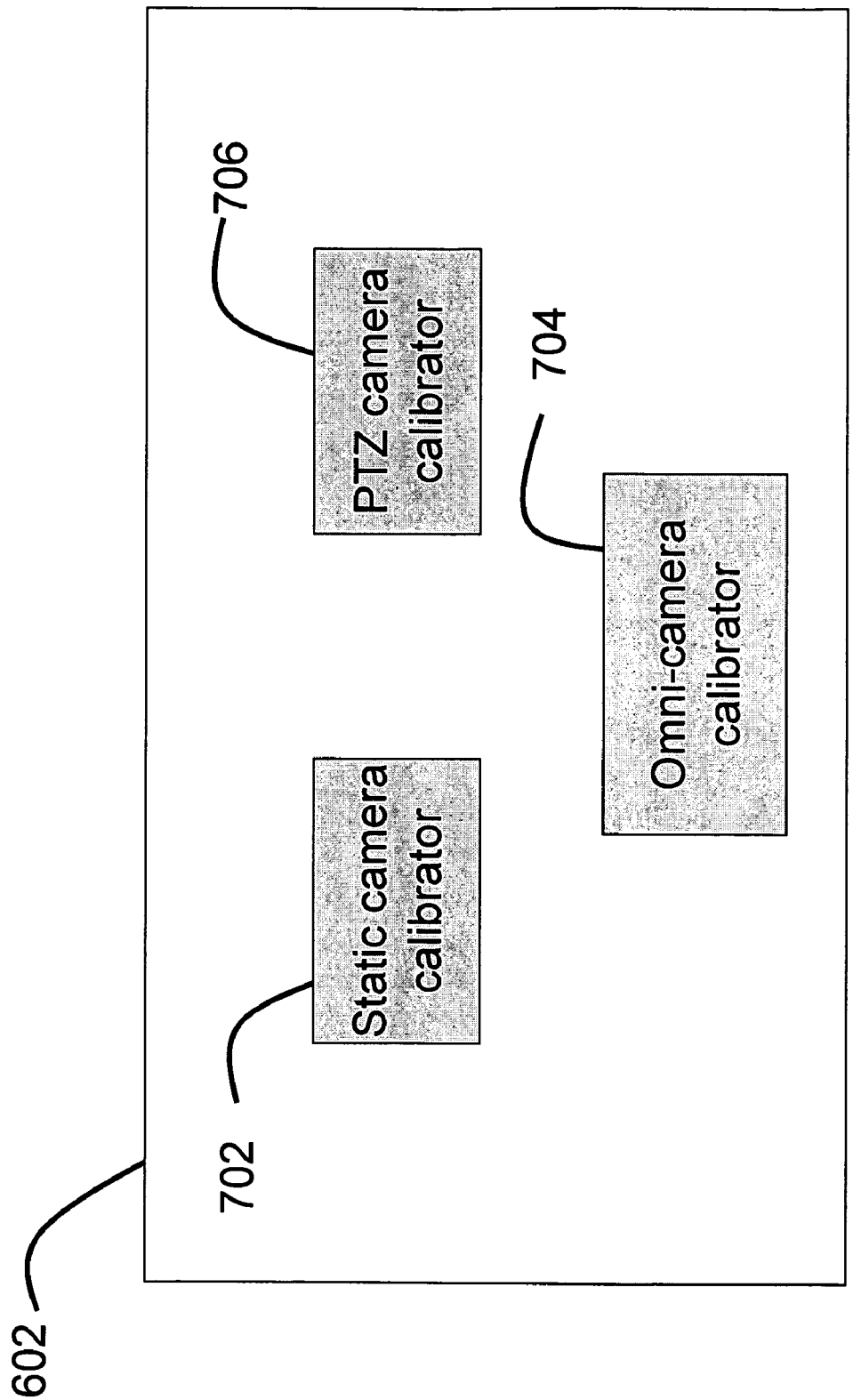
FIG. 7 illustrates the three major modules in the map-based calibrator.

FIG. 7 illustrates the three exemplary modules in the map-based calibrator 602. Module 702 may be used to calibrate normal static cameras, module 704 may be used to calibrate PTZ cameras, and module 706 may be specially used for omni-cameras.

Figure 8:
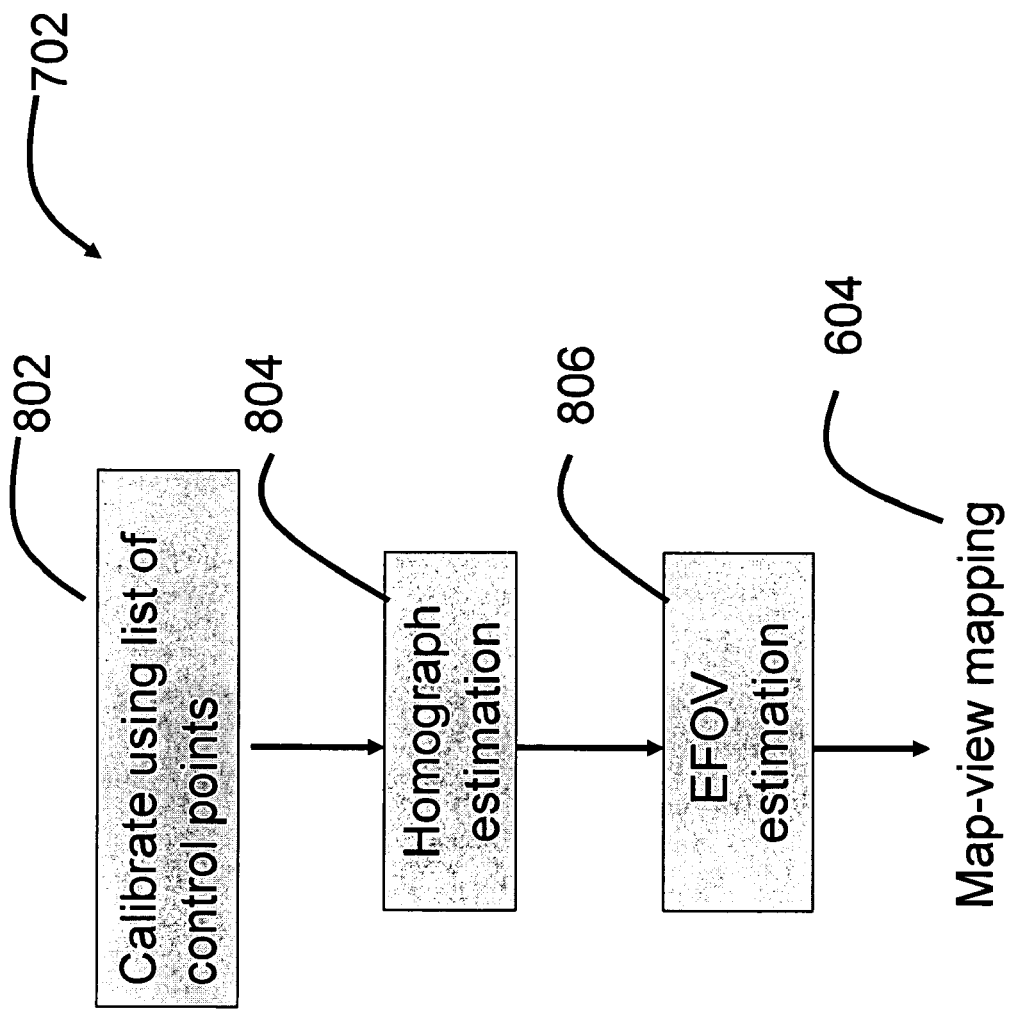
FIG. 8 depicts the procedures to calibrate a normal static camera.

FIG. 8 shows an exemplary procedure to calibrate a normal static camera, as performed by module 702. A homograph estimation method may generate an image to site map mapping. A homograph H may be a 3×3 matrix associating two 3D planes in the space. It may be used extensively to map one 3D place to an image plane, or two image planes from different cameras. In block 802, the ground plane in the video frame may be calibrated to the ground on the site map by using some landmark control points. The minimum number of control point pairs may be four. In block 804, the map-to-image homographs may be computed for all the static cameras. Since every camera view may be mapping onto the same site map, all of the cameras may be automatically co-calibrated. In block 806, in addition to the homograph, the static camera calibrator may also estimate the effective field of view (EFOV) of each camera on the map. This EFOV may provide the user the effective monitoring area of each camera in the site. If a target of interest, e.g. a human, moves out of the EFOV, the video sensor may not be able to detect and track it reliably due mainly to the small target image size. The accuracy of the EFOV may not only help the user to plan the camera placements, but may also be used for the target fusion engine to perform cross camera target handoff. To estimate the EFOV of each camera, two criteria may be used: an average human image size at this location must be greater than a threshold T_human_min_image_size, which may be determined by the sensitivity of each video sensor; and, the mapping imprecision from the image to the map must be less than a threshold T_max_mapping_imprecision. The second criterion may be to ensure that the mapping between each camera view image and the site map may be generally fairly accurate.

Figure 9:
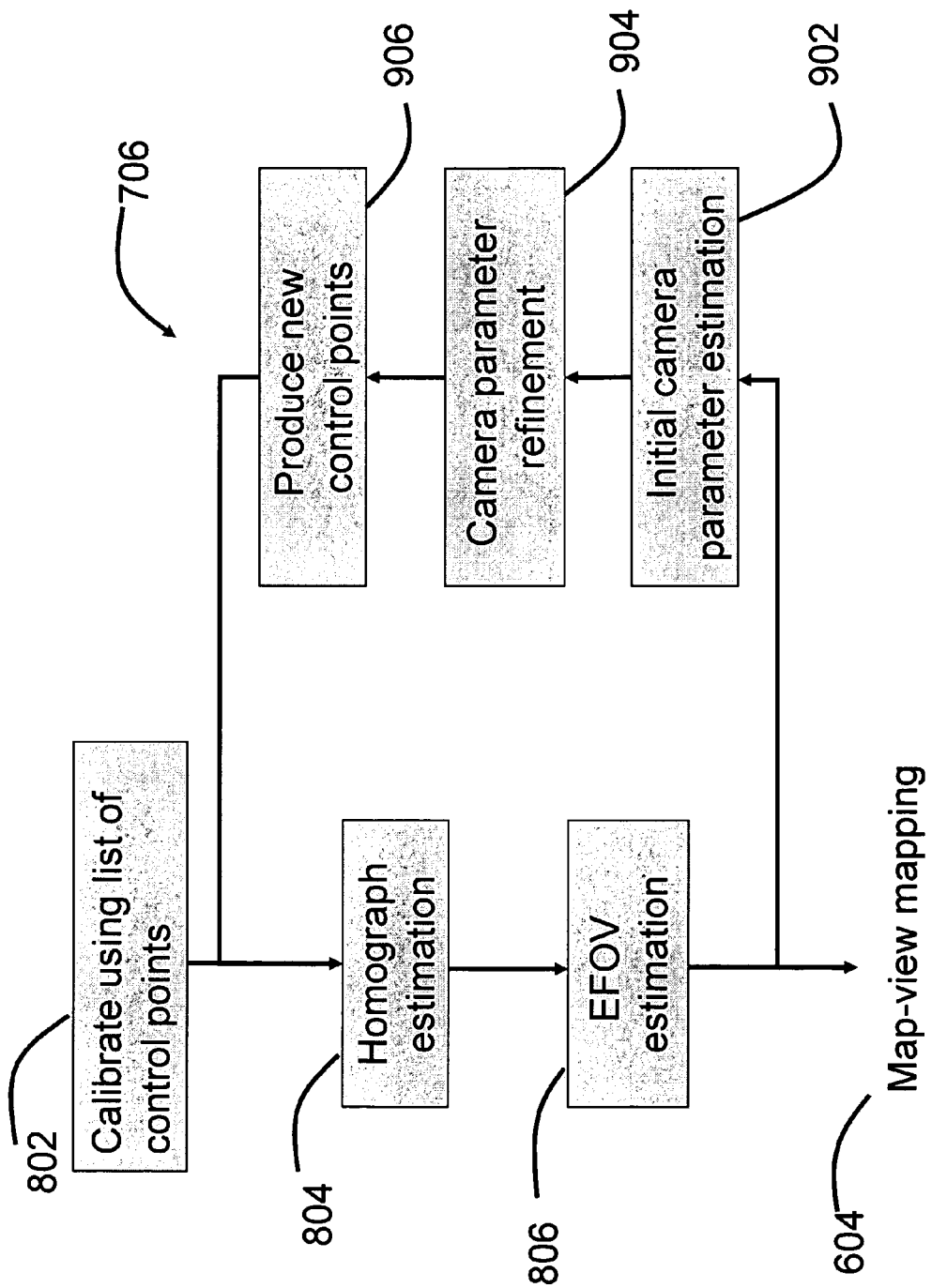
FIG. 9 depicts the procedure to perform the PTZ camera calibration.

FIG. 9 depicts the procedure to perform the PTZ camera calibration, as performed by block 706. In order to control the camera pan, tilt and zoom, the exact camera extrinsic calibration parameters may need to be known, including camera map location and height, initial pan, tilt, roll angles and zoom level, and the camera relative intrinsic calibration parameters, including especially the relative focal length compared to the image size. Embodiments of the present invention may use a method to estimate the camera calibration parameters that may only need to compute one 2D plane (site map) to image plane mapping. This may be much simpler to operate in practice than the conventional calibration methods. In block 802, the user selects control points. In block 804, the user selected control points 802 may be used to compute the homograph between the map ground plane and the image ground plane. In block 806, from the homograph, the EFOV of the camera on the map may be estimated. In block 902, using the perspective camera projection model, the map EFOV and the corresponding polygon in the image frame, an initial estimate on the camera calibration parameters may be provided. Once the camera calibration parameters are obtained, the calibration matrix may be derived through the camera rotation, translation and projection operations, thereby setting up coordination transformation between image space and map space. Note that the homograph that was obtained earlier may be doing the same job. In module 904, the main task may be to refine the camera calibration estimation to make the calibration matrix consistent with the homograph matrix. The refinement may be done by iteratively searching the parameter space around the initial values using coarse to fine steps. Here, one set of camera calibration parameters may correspond to one and only one homograph between one 3D world plane and the image plane. Assuming that the homograph obtained earlier is valid, the final optimal calibration parameters may be the values that generate minimum mean control points matching error. Since the inventive system may assume the ground of the site is a plane, which may not be perfectly satisfied in practice, this final matching error may be also one type of accuracy measure on this assumption and the precision on the user input control points. The smaller the error, the more accurate the estimated map-view mapping may be. In block 906, the final homograph and the EFOV may be then recomputed using the new control points obtained through the final camera calibration parameters.

The map-view mapping 604 may provide the physical location information of each view target, especially when the view target footprint may be used as the location and velocity estimation. But since the site map may be a 2D representation, the exact 3D dimensions of the target may be still lacking. This physical size information may be used to perform tasks such as target classification. Human size map 608 may be used to provide the physical size information of each map target. The human size map 608 may be a frame size lookup table that shows, on each image position, what the expected average human image height and image area are. To estimate the physical size of an image target, the target's relative size may be compared to the expected average human size at that image position. The target's relative size may be converted to an absolute physical size using an estimated average human size, for example, 1.75 meters in height and 0.5 meters in width and depth.

There may be at least two methods of producing this human size map for each camera. First, if a camera-to-map calibration is available, the map may be generated by projecting the 3D human object back onto the image.

Second, if no camera-to-map calibration is available, the human size map may be generated by self-learning. In self-learning, human detection and tracking may be performed on each sensor. As shown in FIG. 10(a), the human model may include two parts: the head model 1002 and shape model 1004. A head detection and tracker may be used to detect and track human heads. To detect the human shape, the system may require that a human object must be of a certain shape, specifically, the height to width ratio must be within a certain range. When a target satisfies both head and shape models for a certain duration, the probability that the target is a human may be very high (e.g., greater than 99.5% certain). As shown in FIG. 10(b), these high probability targets may be added into the human size statistic table. Each section of the table represents an area of the image. The shade of the section represents the average size of human observed at area of the image. In this case, the darker the section, the larger the average size of observed humans. (The fact that the shaded area may be resembles a human head and shoulders may be coincidental.) When enough data is collected, the human size map may be generated by averaging and interpolating on the human size statistic table.

Figure 11:
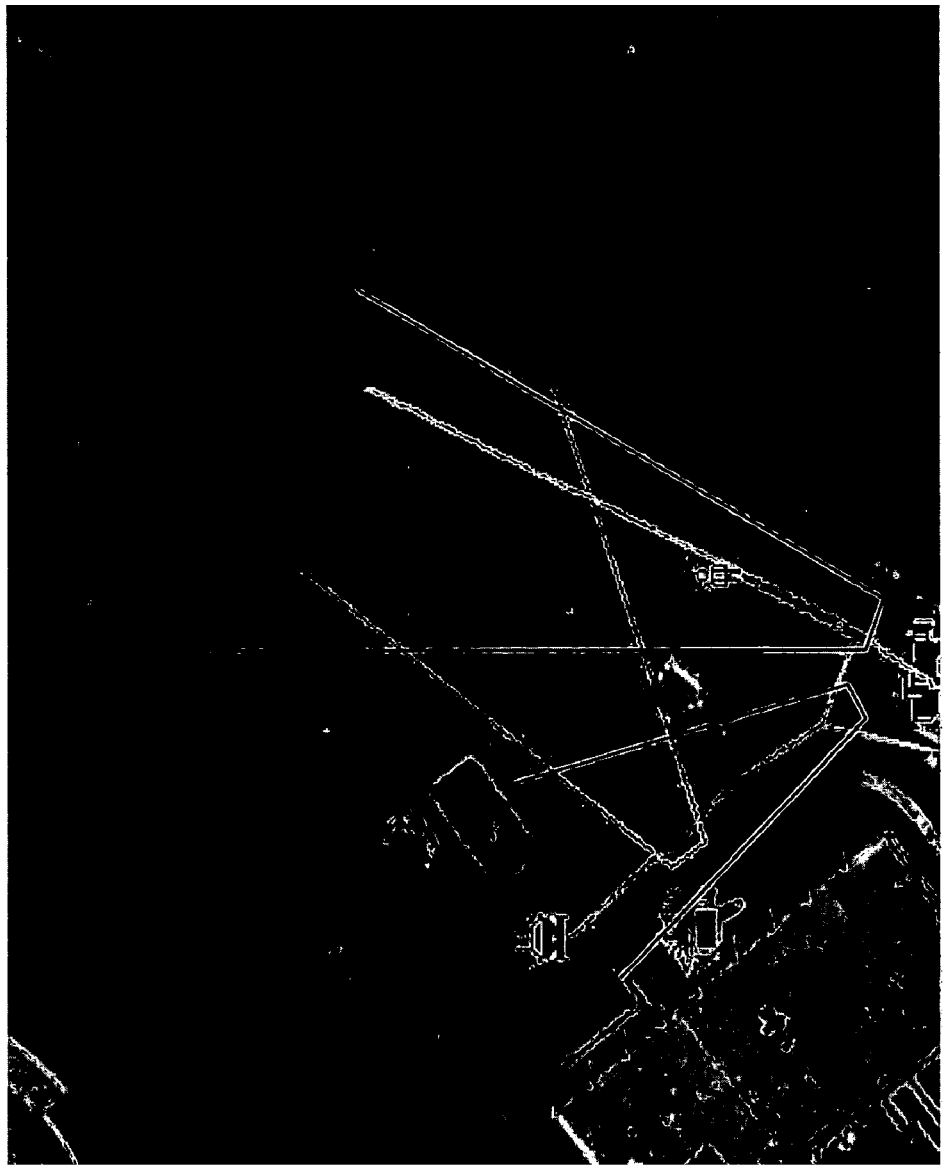
FIG. 11 depicts an example case that the site map may be an aerial photo, in which enough control points may be available.

Embodiments of the wide-area site-based IVS system of the present invention may support a flexible site model. The site map that the system supports may be in several formats. For example, FIG. 11 shows a site map that may be an aerial photo, in which enough control points may be available. In this case, map-view mapping 604 and human size map 608 may be directly computed, and the camera network model 612 may also be obtained indirectly.

Figure 12:
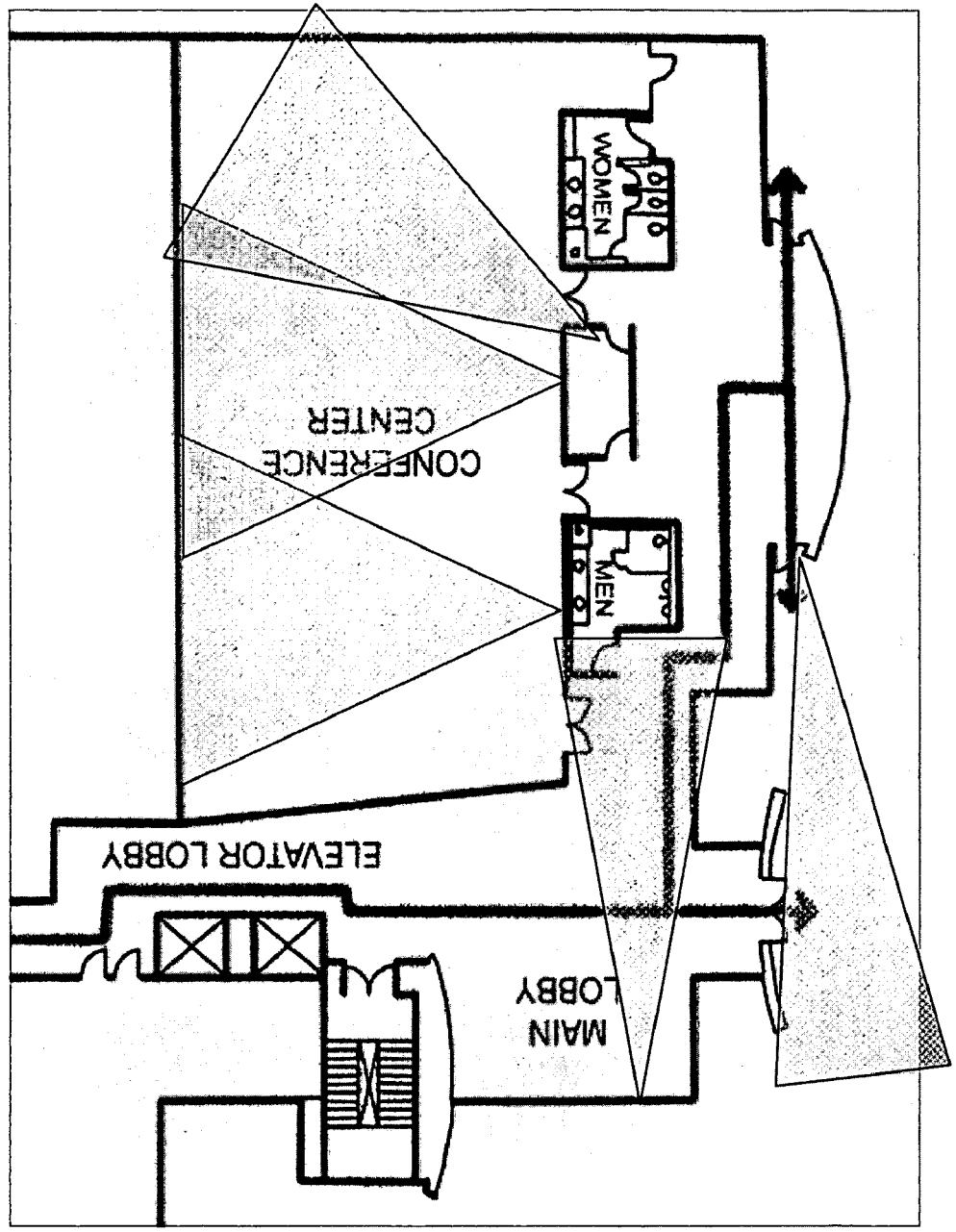
FIG. 12 illustrates another application example that may use a building blueprint as the site map.

FIG. 12 illustrates another example where the site map may be a building blueprint. In this case, control points may be available, for example, a corner of the room.

Figure 13:
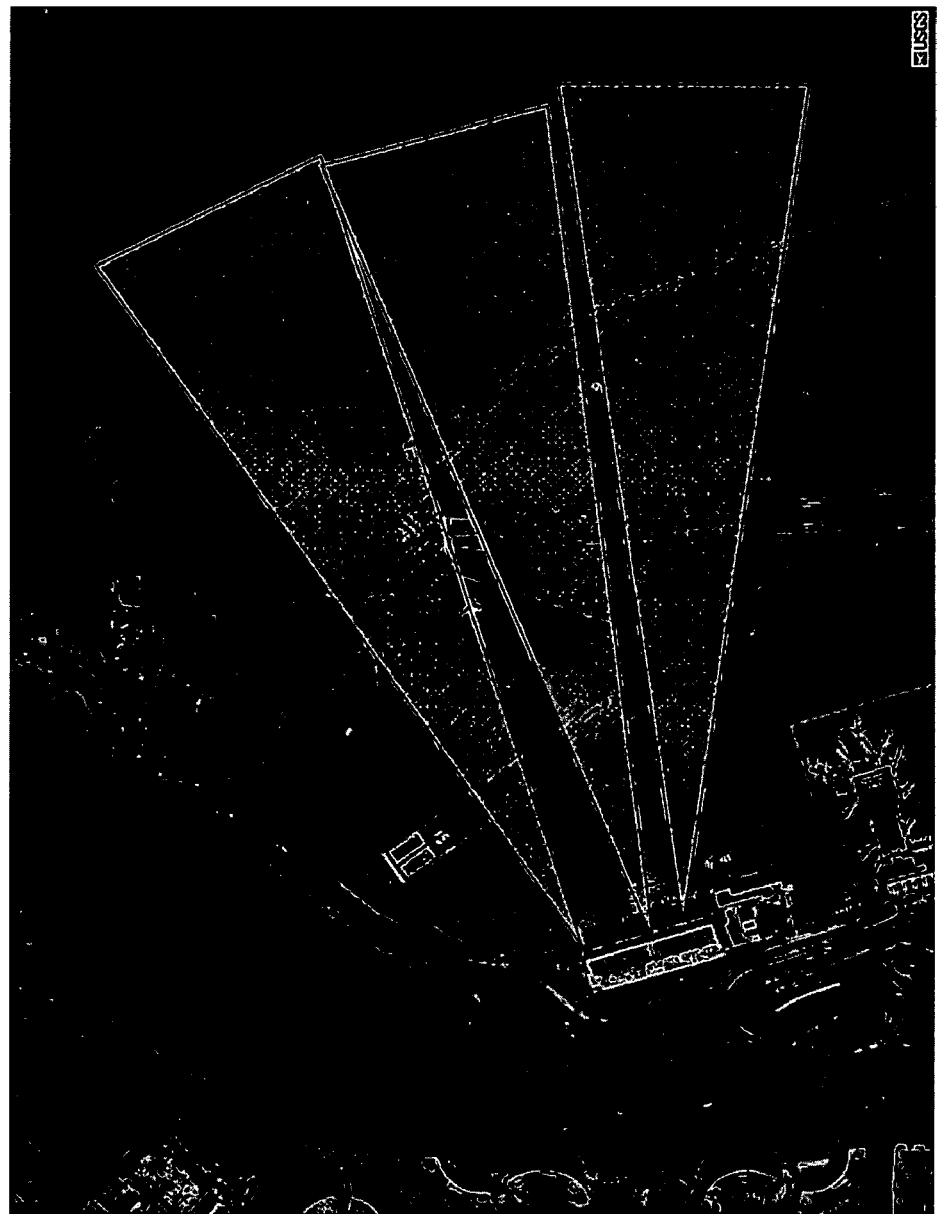
FIG. 13 illustrates another example case where only a map may be available but no control points.

FIG. 13 illustrates an example case where the map may be available but there may be no control points. Here, user input estimate camera FOVs may be accepted by the system to provide an initial setup on the camera network model 612.

Figure 14:
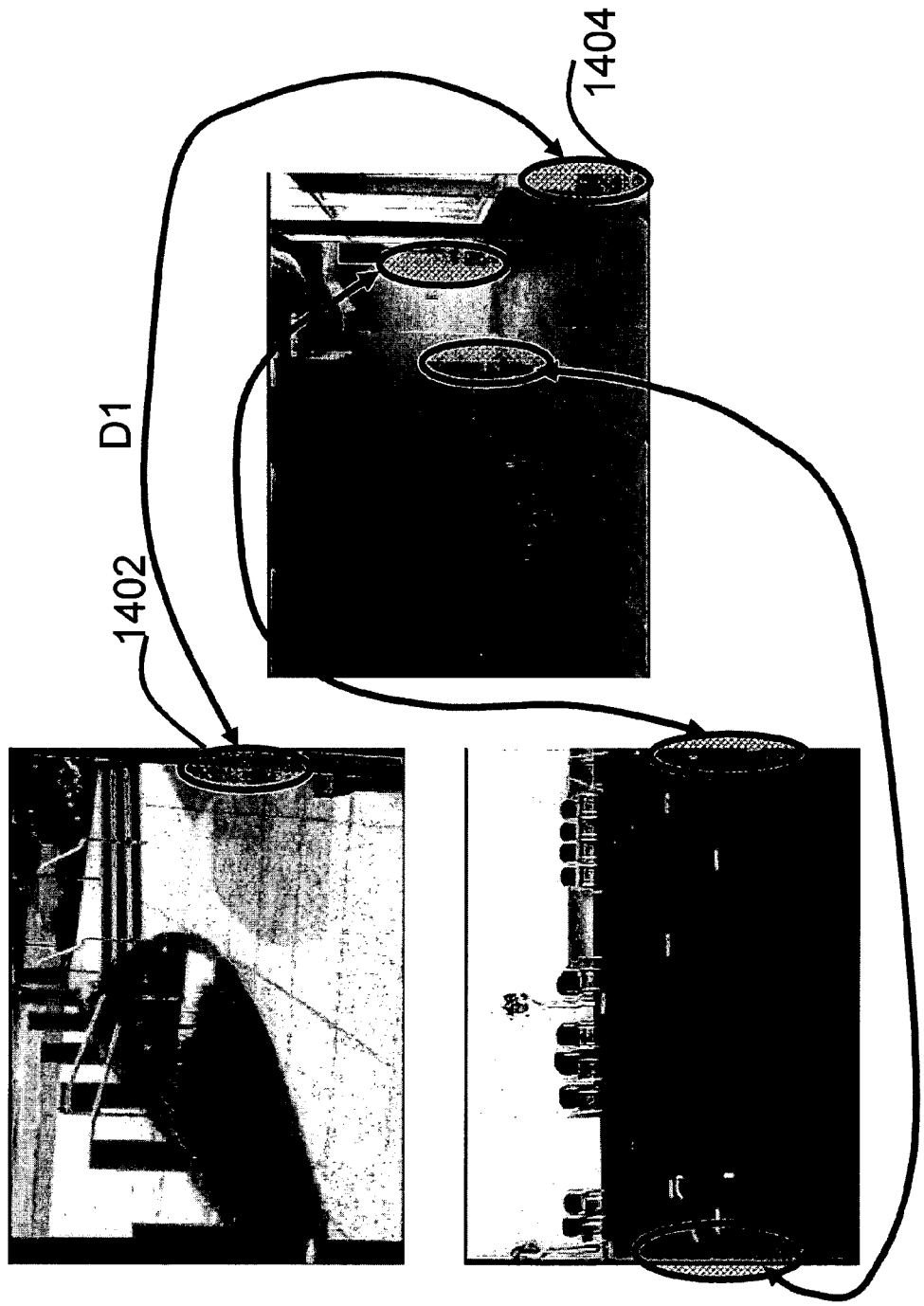
FIG. 14 illustrates how to provide camera connection information through GUI.

If no site map is available, the user may need to provide the camera connection information through the GUI, which may be used by the system to produce the camera network model 612 at the background. An example of camera connection information may be illustrated in FIG. 14. A connection between two cameras includes two parts: the connecting entry/exit regions on both cameras and the approximate physical distance between the two entry/exit regions. For example, in FIG. 14, entry/exit regions 1402 and 1404, separated by a distance D1 form a connection. Based on this connection information, either the user or the system may produce a computer graphical drawing of the site showing the camera relative locations, illustrative FOVs, the entry/exit regions and the estimated distance among the entry/exit regions. Internally, the camera network model 612 may be created and then continuously updated by the camera network model manager using the past high confidence map targets. Here, high confidence may mean that the map target may be consistent in size and shape and may have been tracked by the system for a relatively long duration.

Figure 15:
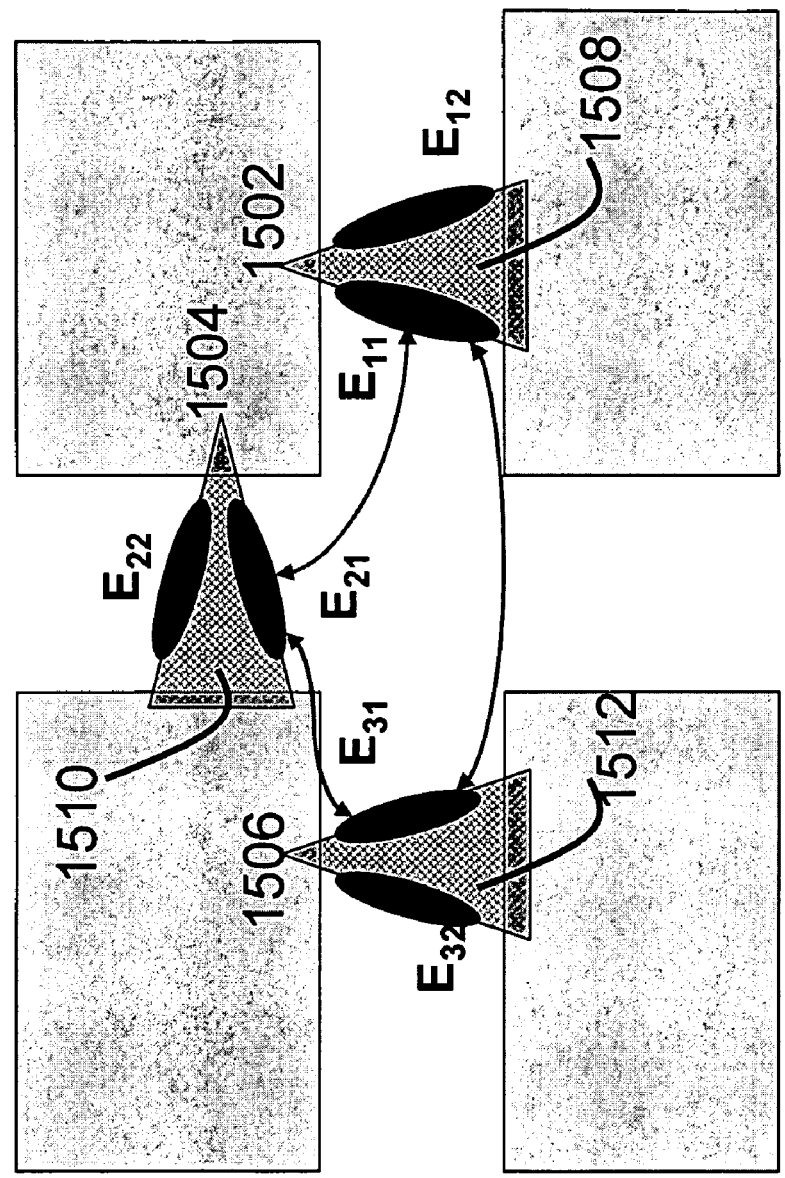
FIG. 15 illustrates a camera network model.

FIG. 15 illustrates an exemplary camera network model 612. Each camera 1502, 1504, 1506 may have a FOV 1508, 1510, 1512, respectively. Each FOV may have at least one entry/exit point, designated as E11, E12, E21, E22, E31, and E32. A path from E21 to E11 is possible, while a path from E22 directly to E12 is not possible. An object may, for example, exit FOV 1510 and later enter FOV 1508, and the system may be able to determine that the targets from camera 1504 and camera 1502 were the same target based on the network model and the appearance matching.

Figure 16:
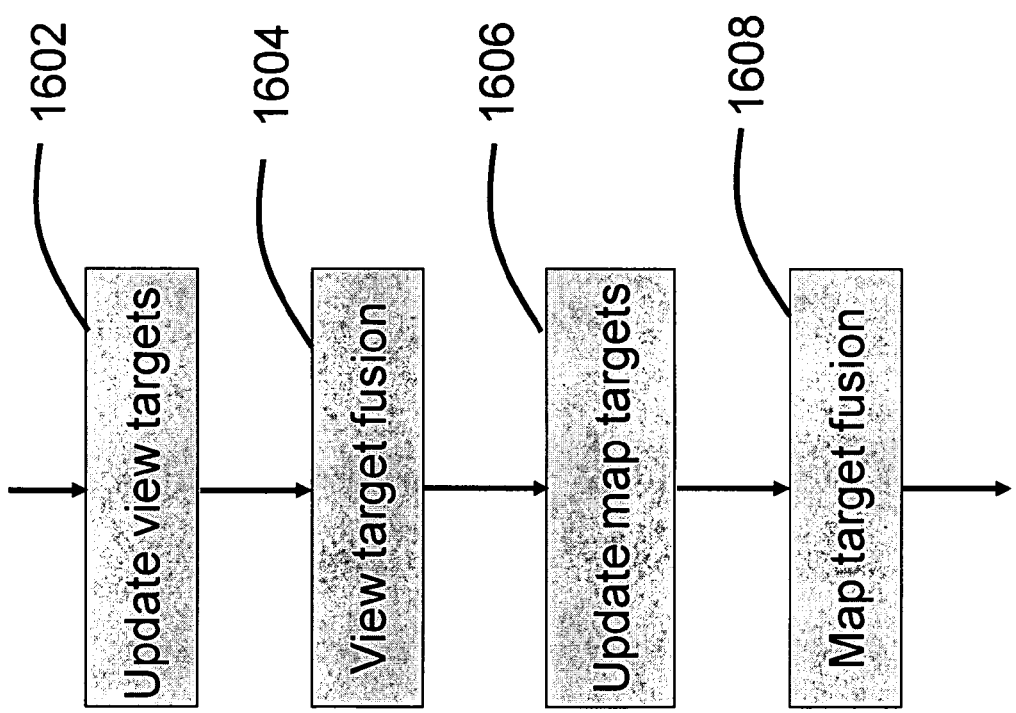
FIG. 16 depicts a conceptual block diagram of map target engine.

FIG. 16 depicts one iteration of map target fusion engine process 504. On each set of synchronized input target data, the map target engine may have four pipeline processes. The first module 1602 may update view targets. Here, each view target may correspond to one image target produced by each video sensor. Compared to an original image target, a view target may further have a map location and size information. The correspondence between the view target and the image target may be the view target ID. There may be two types of view targets in the system. One type may include existing view targets that have been fused into a map target. The other type may include all new view targets which have not been fused into any map target. One map target may contain multiple view targets from different views or from the same view but in different temporal segments. At each time stamp, the map target may have a primary view target that provides the most reliable representation of the physical object at that time.

After all the existing view targets have been updated with current location and size information, the view target fusion module looks for any stable new view targets to see if they belong to any existing map targets. If the new view target matches an existing map target, it will be merged into this map target in block 1604, and trigger the map target update in block 1606. Otherwise, the system may produce a new map target based on the new view target. The matching measure between two targets may be the combination of three probabilities: the location matching probability, the size matching probability and the appearance matching probability. The location matching probability may be estimated using the target map location from the map view mapping and the camera network traffic model. The size matching probability may be computed from the relative human size value of each target. The appearance matching probability may be obtained by comparing the two appearance models of the targets under investigation.

The appearance model of an exemplary embodiment may be a distributed intensity histogram, which includes multiple histograms for different spatial partitions of the target. The appearance matching may be the average correlation between the corresponding spatial partitioned histograms. The tasks of the map target update process in block 1606 may be to determine the primary view target and update the general target properties such as map location, velocity, classification type and stability status, etc. Since target occlusion may cause significant map location estimation errors, a map target needs also to be tested for whether it actually corresponds to another existing map target when the map target switches from one stable status to a different stable status. A stable status means the target has consistent shape and size in a temporal window. One map target may have multiple different stable periods due to occlusions. The map target fusion module 1608 may merge two matching map targets in to the one map target that has a longer history.

Figure 17:
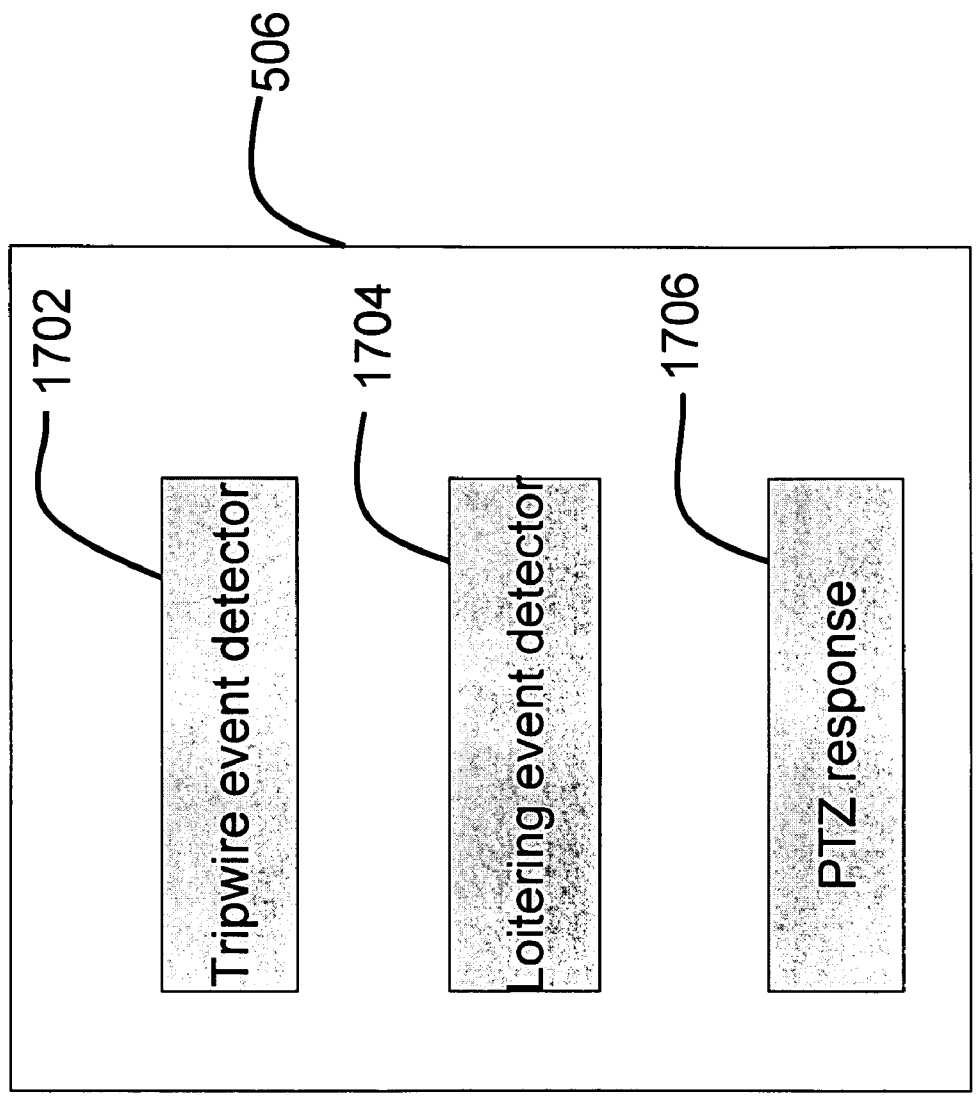
FIG. 17 illustrates some examples of the wide area site-based event detection and responses.

FIG. 17 illustrates some examples of the wide area site-based event detection and responses from event detect and response engine 506. The site model and the cross camera tracking of the map targets may enable performance of wide-area site-based event detection, which is what the traditional single camera based IVS cannot provide. Tripwire event detector 1702 and loitering event detector 1704 may be two typical examples. The definition of the rule and detection of the events may be very similar to those in single camera IVS system: only use site map to replace video frame; and use map target to replace view target. These wide-area map-based events may be used in addition to the single camera based event detections.

In block 1706, the automatic target close up monitoring using PTZ cameras may be performed. Once one target triggers any map-based event, the user may require PTZ camera to zoom-in and follow the target as one type of event response. Based on the target map location and the user required image target resolution, the system may determine the pan, tilt and zoom level of a dedicated PTZ camera and may control the camera to follow the target of interest. In addition, when multiple PTZ cameras exist, the hand-off from one PTZ camera to another PTZ camera in the site may be also developed. This may be achieved by automatically selecting the camera which can provide the required target coverage with the smallest zoom-in level. A larger zoom-in value usually makes the video more sensitive to camera stabilization and PTZ command latencies, which may be undesirable for this application scenario.

Figure 18:
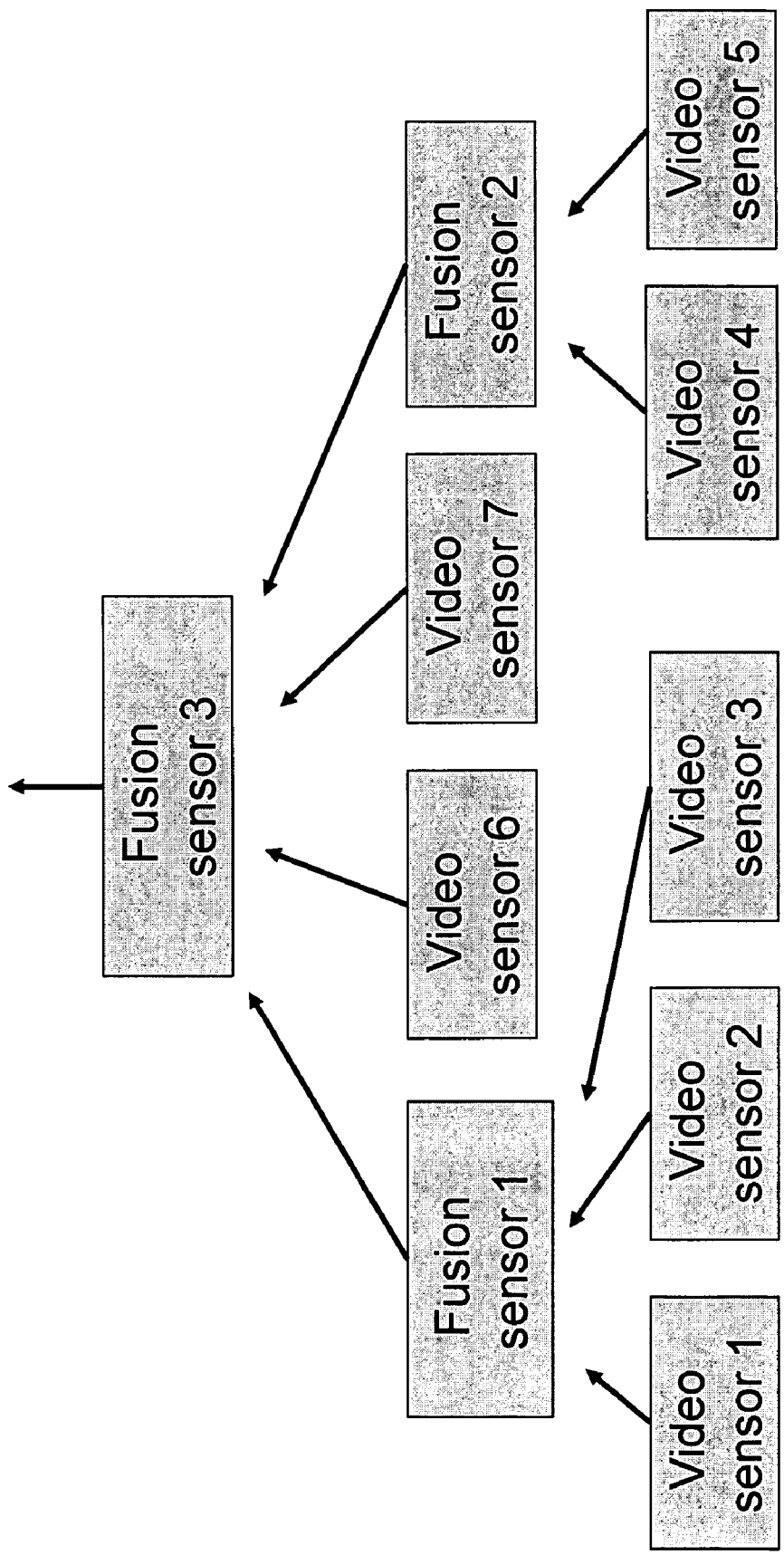
FIG. 18 illustrates how to build an exemplary large system using a scalable structure.

Due to the limited computing power and data bandwidth, one data fusion engine 206 may not be able to handle an unlimited number of inputs. Advantages of the present invention include that it may provide high scalability, and may be easily expandable to monitor bigger areas involving more cameras. FIG. 18 illustrates how to build an exemplary large system using a scalable structure, where the individual IVS system may be a video sensor and site-based multiple IVS system may act as a fusion sensor. This multi-level structure ensures that each fusion sensor only processes a limited amount of input data. The major requirement may be that every fusion sensor use the same site map coordinates, thus the fusion sensor at lower levels only monitors a portion of the top level site.

All examples and embodiments discussed herein are exemplary and non-limiting.

While various embodiments of the present invention have been described above, it should be understood that they have been presented by way of example only, and not limitation. Thus, the breadth and scope of the present invention should not be limited by any of the above-described exemplary embodiments, but should instead be defined only in accordance with the following claims and their equivalents.

What is claimed is:

1. A computer-readable medium containing software that, when read by a computer, causes the computer to perform a method for wide-area site-based surveillance, the method comprising:

receiving surveillance data, including view targets, from a plurality of sensors at a site;

synchronizing said surveillance data to a single time source;

maintaining a site model of the site, wherein said site model comprises a site map, a human size map, and a sensor network model;

analyzing said synchronized data using said site model to determine if said view targets represent a same physical object in the site;

creating a map target corresponding to a physical object in the site, wherein said map target includes at least one view target;

receiving a user-defined global event of interest, wherein said user-defined global event of interest is based on said site map and based on a set of rules;

detecting said user-defined global event of interest in real time based on a behavior of said map target; and responding to said detected event of interest according to a user-defined response to said user-defined global event of interest, wherein said analyzing further comprises:

updating existing view targets with new size, location and appearance information;

determining if a new view target corresponds to an existing map target by comparing location information; and comparing appearances, wherein each view target includes an appearance model that includes a distributed intensity histogram, and wherein comparing appearances comprises: determining an average correlation between said distributed intensity histograms for each of said view targets and said map targets;

merging said new view target into said existing map target, if said new view target corresponds to said existing map target, and updating said existing map target with said new view target;

producing a new map target corresponding to said new view target, if said new view target does not correspond to said existing map target; and determining if two map targets correspond to the same physical object.

2. The computer-readable medium of claim 1, wherein said maintaining a site model comprises:
calibrating a sensor to said site map;
providing a site map location of each view target;
providing an actual size and a velocity of a target; and
providing an object traffic model of the site.

3. The computer-readable medium of claim 1, wherein the method further comprises receiving surveillance data from a fusion sensor.

4. The computer-readable medium of claim 1, wherein at least one of said plurality of sensors monitors a different location in the site than the remaining sensors.

5. The computer-readable medium of claim 1, wherein said analyzing comprises at least one of:
determining if a first view target from a first sensor at a first time represents the same physical object as a second view target from said first sensor at a second time; or
determining if said first view target from said first sensor at said first time represents the same physical object as a third view target from a second sensor at said first time.

6. The computer-readable medium of claim 1, wherein updating said existing map target comprises updating a map location, a velocity, a classification type and a stability status of said map target.

7. The computer-readable medium of claim 1, wherein said synchronizing said surveillance data to a single time source comprises: comparing a time stamp applied to said surveillance data from one sensor to said single time source; discarding said surveillance data from said one sensor when said time stamp and said single time source are different by more than a specified system-allowed latency; and ordering chronologically said surveillance data that is not discarded.

8. A computer system comprising the computer-readable medium of claim 1.

9. A computer-readable medium containing software that, when read by a computer, causes the computer to perform a method for wide-area site-based surveillance, the software comprising:
a data receiver module, adapted to receive and synchronize surveillance data, including view targets, from a plurality of sensors at a site; and
a data fusion engine, adapted to receive said synchronized data, wherein said data fusion engine comprises:
a site model manager, comprising: a map-based calibrator, adapted to calibrate a sensor view to said site map and store said calibration in a map-view mapping; a view-based calibrator, adapted to calibrate a view to an expected average human size and store said calibration in said human size map; and a camera network model manager, adapted to create and store said sensor network model, wherein said site model manager is adapted to maintain a site model, and wherein said site model comprises a site map, a human size map, and a sensor network model;
a target fusion engine, adapted to analyze said synchronized data using said site model to determine if said view targets represent a same physical object in the site, and create a map target corresponding to a physical object in the site, wherein said map target comprises at least one view target; and
an event detect and response engine, adapted to detect an event of interest based on a behavior of said map target, wherein said map-based calibrator includes a static camera calibrator, a point-tilt-zoom (PTZ) camera calibrator, and an omni-camera calibrator, and wherein said PTZ camera calibrator is adapted to:
(a) estimate a homograph using a set of control points from said site map;
(b) estimate an effective field of view for each sensor from said homograph;
(c) estimate initial PTZ camera parameters, including at least one of camera map location, camera height, pan, tilt, roll, zoom, or relative focal length compared to image size;
(d) refine said camera parameters such that said camera parameters are consistent with said homograph;
(e) produce a new set of control points; and
(f) repeat steps (a) through (e) until an acceptable error based on said control points is achieved.

10. The computer-readable medium of claim 9, wherein said static camera calibrator is adapted to:
calibrate a ground plane in a video frame to a ground on said site map, using at least one control point;
map a view for each of said plurality of sensors to said site map using a homograph estimation; and
estimate an effective field of view for each of said plurality of sensors using said human size map.

11. The computer-readable medium of claim 9, wherein at least one of said plurality of sensors monitors a different location at the site than the remaining sensors.

12. The computer-readable medium of claim 9, wherein said site map comprises one of an aerial photograph, a computer graphical drawing, a blueprint, a photograph, or a video frame.

13. The computer-readable medium of claim 12, wherein said site map comprises a plurality of control points.

14. The computer-readable medium of claim 9, wherein said sensor network model comprises a set of entry/exit points for each sensor field of view, and a set of possible paths between said entry/exit points.

15. The computer-readable medium of claim 9 wherein said event detect and response engine is adapted to zoom a first pan-tilt-zoom (PTZ) camera in to a view target and to follow said view target until said view target leaves a field of view for said first PTZ camera.

16. The computer-readable medium of claim 15, wherein said event detect and response engine is further adapted to direct a second PTZ camera to follow said view target when said view target leaves said field of view for said first PTZ camera and enters a field of view for said second PTZ camera.

17. The computer-readable medium of claim 9, wherein said data fusion engine is adapted to receive a user-defined global event of interest, wherein said user-defined global event of interest is based on said site map.

18. A first fusion sensor comprising the computer-readable medium of claim 9, said first fusion sensor producing surveillance data.

19. A second fusion sensor adapted to receive said surveillance data from said first fusion sensor of claim 18.

20. The second fusion sensor of claim 19, further adapted to receive and synchronize surveillance data, including view targets, from another plurality of sensors.

21. A computer-readable medium containing software that, when read by a computer, causes the computer to perform a method for wide-area site-based surveillance, the software comprising:

a data receiver module, adapted to receive and synchronize surveillance data, including view targets, from a plurality of sensors at a site; and a data fusion engine, adapted to receive said synchronized data, wherein said data fusion engine comprises:

a site model manager, adapted to maintain a site model, wherein said site model comprises a site map, a human size map, and a sensor network model;

a target fusion engine, adapted to analyze said synchronized data using said site model to determine if said view targets represent a same physical object in the site, and create a map target corresponding to a physical object in the site, wherein said map target comprises at least one view target; and an event detect and response engine, adapted to detect an event of interest based on a behavior of said map target, wherein said human size map comprises a data structure based on a frame size that provides, at each image position in said frame, an expected average human image height and image area, and wherein when a camera-to-map calibration is not available, a view-based calibrator is adapted to construct said data structure by:

detecting and tracking a potential human object in a view over a time period;

when said potential human object satisfies a human head model and a human shape model for a specified duration, updating a human size statistic data structure with a size of said potential human object, wherein each section of said human size statistic data structure corresponds to a section of said view, and represents the average size of a human detected in said section of said view; and for a section in said human size statistic data structure with insufficient data, interpolating values from surrounding sections to determine an average for said section in said table with insufficient data.

* * * * *